US012638794B2

(12) United States Patent
Masuda

(10) Patent No.: US 12,638,794 B2
(45) Date of Patent: May 26, 2026

(54) FIXING DEVICE AND IMAGE FORMING APPARATUS EACH CAPABLE OF PREVENTING FIXING MEMBER FROM BEING DAMAGED BY EXCESSIVE HEATING

(71) Applicant: KYOCERA Document Solutions Inc., Osaka (JP)

(72) Inventor: Masatoshi Masuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/040,230

(22) Filed: Jan. 29, 2025

(65) Prior Publication Data

US 2025/0264830 A1 Aug. 21, 2025

(30) Foreign Application Priority Data

Feb. 16, 2024 (JP) ................................. 2024-021599

(51) Int. Cl.
*G03G 15/20* (2006.01)
*G03G 15/00* (2006.01)

(52) U.S. Cl.
CPC ....... *G03G 15/205* (2013.01); *G03G 15/5004* (2013.01); *G03G 2215/00084* (2013.01)

(58) Field of Classification Search
None
See application file for complete search history.

(56) References Cited

U.S. PATENT DOCUMENTS 6,381,422 B1 * 4/2002 Tanaka ............... G03G 15/2064 399/68
2003/0206756 A1 * 11/2003 Kanamori .............. G03G 15/20 399/328
2005/0258158 A1 11/2005 Takami et al.
2009/0252518 A1 * 10/2009 Eun ...................... G03G 15/657 399/68
2021/0011409 A1 * 1/2021 Sakamoto ............ G03G 15/234

FOREIGN PATENT DOCUMENTS

JP 2005321573 A 11/2005

* cited by examiner

*Primary Examiner* — Sevan A Aydin
(74) *Attorney, Agent, or Firm* — Alleman Hall LLP

(57) ABSTRACT

A fixing device includes a motor, a heater, a power supply stopping portion, and a threshold setting portion. The motor rotates a fixing member that fixes a toner image transferred to a sheet onto the sheet. The heater heats the fixing member upon being supplied with power. In a case where temperature of the fixing device exceeds a threshold, the power supply stopping portion stops supply of power to the heater. The threshold setting portion changes the threshold from a first temperature to a second temperature higher than the first temperature in an acceleration period in which rotation speed of the motor increases, and changes the threshold from the second temperature to the first temperature when a deceleration period in which the rotation speed of the motor decreases starts.

2 Claims, 6 Drawing Sheets

FIXING DEVICE AND IMAGE FORMING APPARATUS EACH CAPABLE OF PREVENTING FIXING MEMBER FROM BEING DAMAGED BY EXCESSIVE HEATING

INCORPORATION BY REFERENCE

This application is based upon and claims the benefit of priority from the corresponding Japanese Patent Application No. 2024-021599 filed on Feb. 16, 2024, the entire contents of which are incorporated herein by reference.

BACKGROUND

This disclosure relates to a fixing device and an image forming apparatus.

An electrophotographic image forming apparatus includes a fixing device. For example, the fixing device includes a fixing member, a motor, a heater, a temperature sensor, and a power supply stopping portion. The fixing member fixes a toner image transferred to a sheet onto the sheet. The motor rotates the fixing member. The heater heats the fixing member upon being supplied with power. The temperature sensor senses the temperature of the fixing device. The power supply stopping portion stops the supply of power to the heater in a case where the temperature sensed by the temperature sensor exceeds a preset threshold.

In addition, a fixing device capable of changing the threshold from a first temperature to a second temperature higher than the first temperature in a case where the rotation speed of the motor increases beyond a predefined reference speed, and changing the threshold from the second temperature to the first temperature in a case where the rotation speed of the motor decreases beyond the reference speed has been known as the related art.

SUMMARY

A fixing device according to an aspect of this disclosure includes a fixing member, a motor, a heater, a temperature sensor, a power supply stopping portion, a threshold setting portion. The fixing member fixes a toner image transferred to a sheet onto the sheet. The motor rotates the fixing member. The heater heats the fixing member upon being supplied with power. The temperature sensor senses the temperature of the fixing device. The power supply stopping portion stops supply of power to the heater in a case where the temperature sensed by the temperature sensor exceeds a preset threshold. The threshold setting portion changes the threshold from a predefined first temperature to a second temperature higher than the first temperature in an acceleration period in which rotation speed of the motor increases, and changes the threshold from the second temperature to the first temperature when a deceleration period in which the rotation speed of the motor decreases starts.

An image forming apparatus according to another aspect of this disclosure includes an image forming portion. The image forming portion includes the fixing device and forms an image on the sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described with reference to the accompanying drawings. It is to be noted that the following embodiment is a specific example of this disclosure and does not limit the technical scope of this disclosure.

Configuration of Image Forming Apparatus 100

First, the configuration of an image forming apparatus 100 according to an embodiment of this disclosure will be described with reference to FIGS. 1 and 2. Here, FIG. 1 is a cross-sectional view of the configuration of the image forming apparatus 100.

It is to be noted that the perpendicular direction with the image forming apparatus 100 placed in an installation state (state shown in FIG. 1) that allows for use is defined as an up-down direction D1 for convenience of description. In addition, a front-back direction D2 is defined by using the left surface of the image forming apparatus 100 shown in FIG. 1 as a front (front surface). Furthermore, a left-right direction D3 is defined on the basis of the front of the image forming apparatus 100 in the installation state.

The image forming apparatus 100 is a printer having a print function of forming an image on the basis of image data. It is to be noted that this disclosure is applicable to a facsimile apparatus, a copier, a multifunction peripheral, and the like that each form an image by electrophotography.

Figure 1:
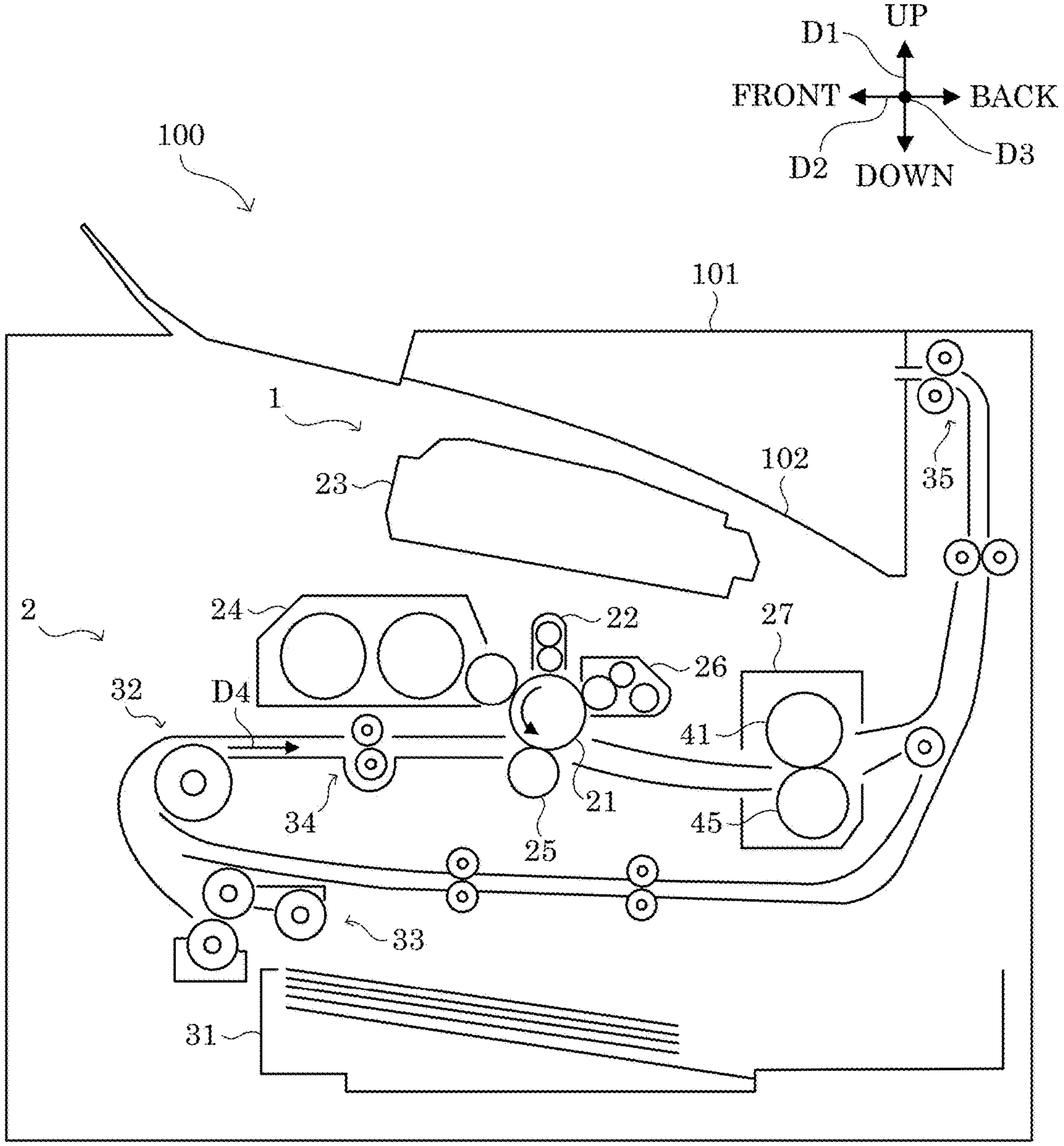
FIG. 1 is a diagram showing a configuration of an image forming apparatus according to an embodiment of this disclosure.
Figure 2:
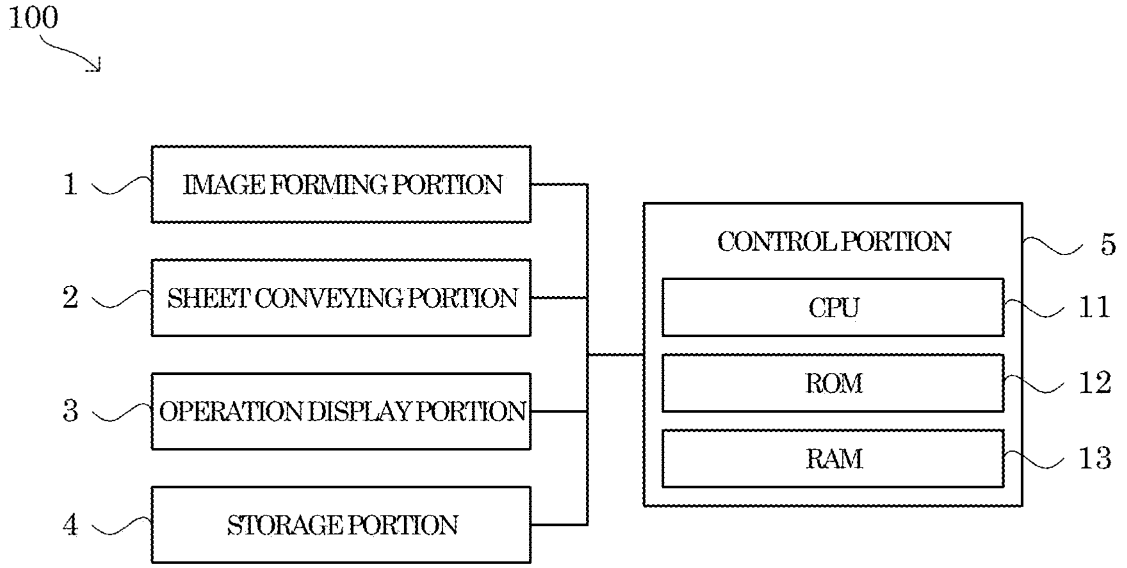
FIG. 2 is a diagram showing a system configuration of the image forming apparatus according to the embodiment of this disclosure.

As shown in FIGS. 1 and 2, the image forming apparatus 100 includes an image forming portion 1, a sheet conveying portion 2, an operation display portion 3, a storage portion 4, and a control portion 5. The image forming portion 1, the sheet conveying portion 2, the storage portion 4, and the control portion 5 are housed in a housing 101 (see FIG. 1) of the image forming apparatus 100. The housing 101 is formed to have a substantially rectangular-cuboid shape. The operation display portion 3 and a sheet receiving portion 102 (see FIG. 1) to which a sheet on which an image has been formed by the image forming apparatus 100 is discharged are formed in the upper portion of the housing 101.

The operation display portion 3 is a user interface of the image forming apparatus 100. The operation display portion 3 includes a display portion such as a liquid-crystal display that displays various kinds of information in response to a control instruction from the control portion 5 and an operation portion such as an operation key or a touch panel that inputs various kinds of information to the control portion 5 in response to an operation of a user.

The storage portion 4 is a non-volatile storage device. For example, the storage portion 4 is a non-volatile memory such as a flash memory.

The control portion 5 integrally controls the image forming apparatus 100. As shown in FIG. 2, the control portion 5 includes a CPU 11, a ROM 12, and a RAM 13. The CPU 11 is a processor that executes various calculation processes. The ROM 12 is a non-volatile storage device in which information about a control program or the like for causing the CPU 11 to execute various processes is stored in advance. The RAM 13 is a volatile or non-volatile storage device that is used as a temporary storage memory (work area) for various processes which are executed by the CPU 11. In the control portion 5, the CPU 11 executes various control programs stored in advance in the ROM 12. This causes the control portion 5 to integrally control the image forming apparatus 100. It is to be noted that the control portion 5 may include an electronic circuit such as an integrated circuit (ASIC). In addition, the control portion 5 may be a control portion provided separately from a main control portion which integrally controls the image forming apparatus 100.

The image forming portion 1 is capable of forming an image on a sheet by electrophotography on the basis of image data received from an information processing apparatus such as an external personal computer. As shown in FIG. 1, the image forming portion 1 includes a photoconductor drum 21, a charging device 22, a laser scanning unit 23, a developing device 24, a transfer roller 25, a cleaning device 26, and a fixing device 27.

The photoconductor drum 21 is supported by the housing 101 so as to be rotatable. The photoconductor drum 21 receives rotational driving force transmitted from an unillustrated motor and rotates in an arrow direction shown in FIG. 1.

The charging device 22 charges a surface of the photoconductor drum 21.

The laser scanning unit 23 irradiates the surface of the photoconductor drum 21 charged by the charging device 22 with light based on image data. The laser scanning unit 23 forms an electrostatic latent image on the surface of the photoconductor drum 21.

The developing device 24 uses a developer including toner to develop the electrostatic latent image formed on the surface of the photoconductor drum 21. The developing device 24 forms a toner image on the surface of the photoconductor drum 21.

The transfer roller 25 transfers the toner image formed on the surface of the photoconductor drum 21 to a sheet to be conveyed to the fixing device 27 by the sheet conveying portion 2.

The cleaning device 26 cleans the surface of the photoconductor drum 21 after the toner image is transferred by the transfer roller 25.

The fixing device 27 heats the sheet having the toner image transferred thereto and fixes the toner image onto the sheet.

The sheet conveying portion 2 conveys a sheet on which an image is formed by the image forming portion 1. As shown in FIG. 1, the sheet conveying portion 2 includes a sheet feed cassette 31, a sheet conveyance path 32, a sheet feed unit 33, a registration roller pair 34, and a sheet discharge roller pair 35.

The sheet feed cassette 31 stores a sheet on which an image is formed by the image forming portion 1. As shown in FIG. 1, the sheet feed cassette 31 is provided on the bottom of the housing 101. For example, sheet members such as paper, coated paper, postcard paper, envelopes, and OHP sheets are stored in the sheet feed cassette 31. The sheet feed cassette 31 includes a lift plate that lifts up a plurality of sheets stored therein.

The sheet conveyance path 32 is a sheet movement path that reaches the sheet receiving portion 102 from the sheet feed cassette 31 through the transfer roller 25 and the fixing device 27. The sheet conveyance path 32 is provided with a plurality of roller pairs including the registration roller pair 34 and the sheet discharge roller pair 35. In the sheet conveyance path 32, a sheet conveyed from the sheet feed cassette 31 is conveyed by the plurality of roller pairs in a conveyance direction D4 (see FIG. 1) toward the sheet receiving portion 102. The sheet conveyance path 32 is formed by a pair of conveyance guide members provided in the housing 101.

The sheet feed unit 33 sends sheets stored in the sheet feed cassette 31 to the sheet conveyance path 32 one by one. The sheet feed unit 33 includes a pickup roller, a sheet feed roller, and a retard roller. The pickup roller comes into contact with the upper surface of the uppermost sheet of the plurality of sheets lifted up by the lift plate of the sheet feed cassette 31 and rotates to send the sheet to the sheet feed roller. The sheet feed roller comes into contact with the upper surface of the sheet sent by the pickup roller and rotates to send the sheet to the sheet conveyance path 32. The retard roller is provided below the sheet feed roller to be biased to the sheet feed roller. In a case where the pickup roller sends a plurality of stacked sheets, the retard roller separates the sheets other than the uppermost sheet from the plurality of stacked sheets.

The registration roller pair 34 conveys a sheet to a transfer position by the transfer roller 25 in synchronization with the timing at which a toner image formed on the surface of the photoconductor drum 21 is conveyed to the transfer position by the rotation of the photoconductor drum 21.

The sheet discharge roller pair 35 discharges a sheet onto which a toner image has been fixed by the fixing device 27 to the sheet receiving portion 102.

Configuration of Fixing Device 27

Figure 3:
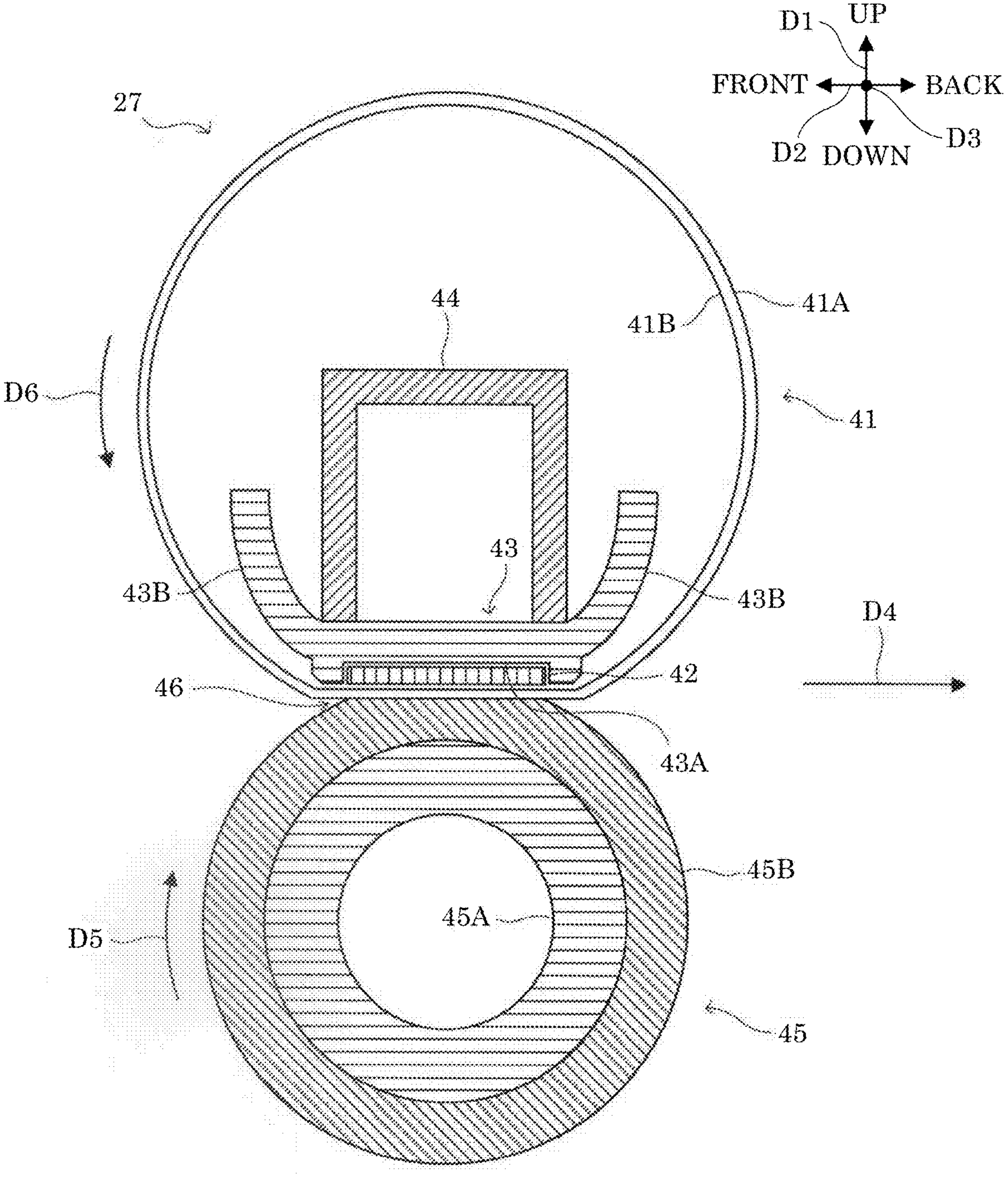
FIG. 3 is a diagram showing a configuration of a fixing device of the image forming apparatus according to the embodiment of this disclosure.
Figure 4:
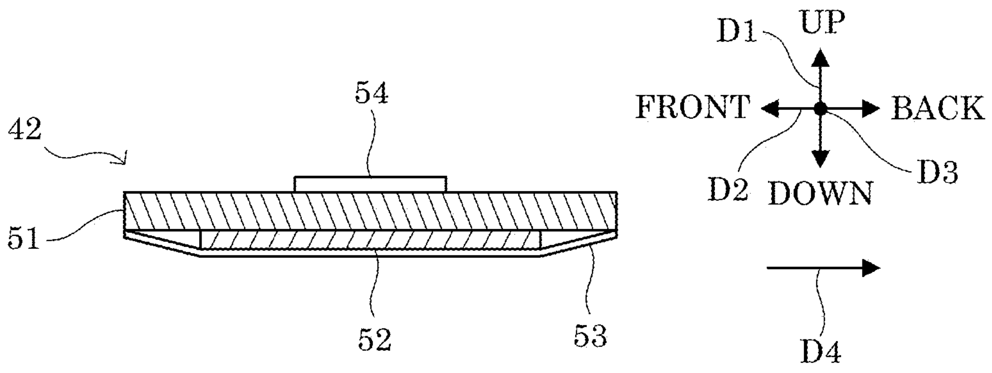
FIG. 4 is a diagram showing a configuration of a heater of the image forming apparatus according to the embodiment of this disclosure.
Figure 5:
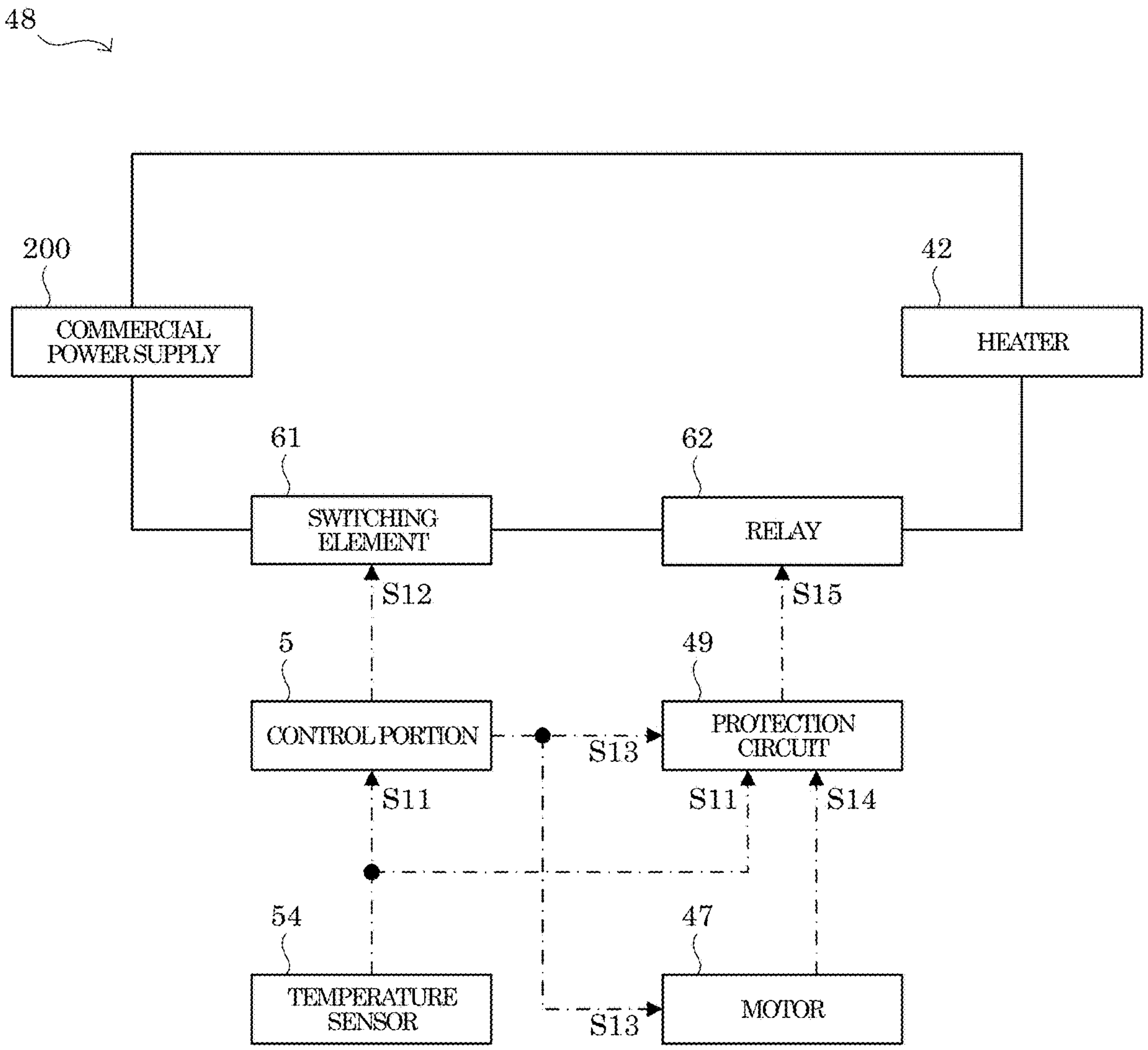
FIG. 5 is a diagram showing a configuration of a heater drive circuit of the image forming apparatus according to the embodiment of this disclosure.
Figure 6:
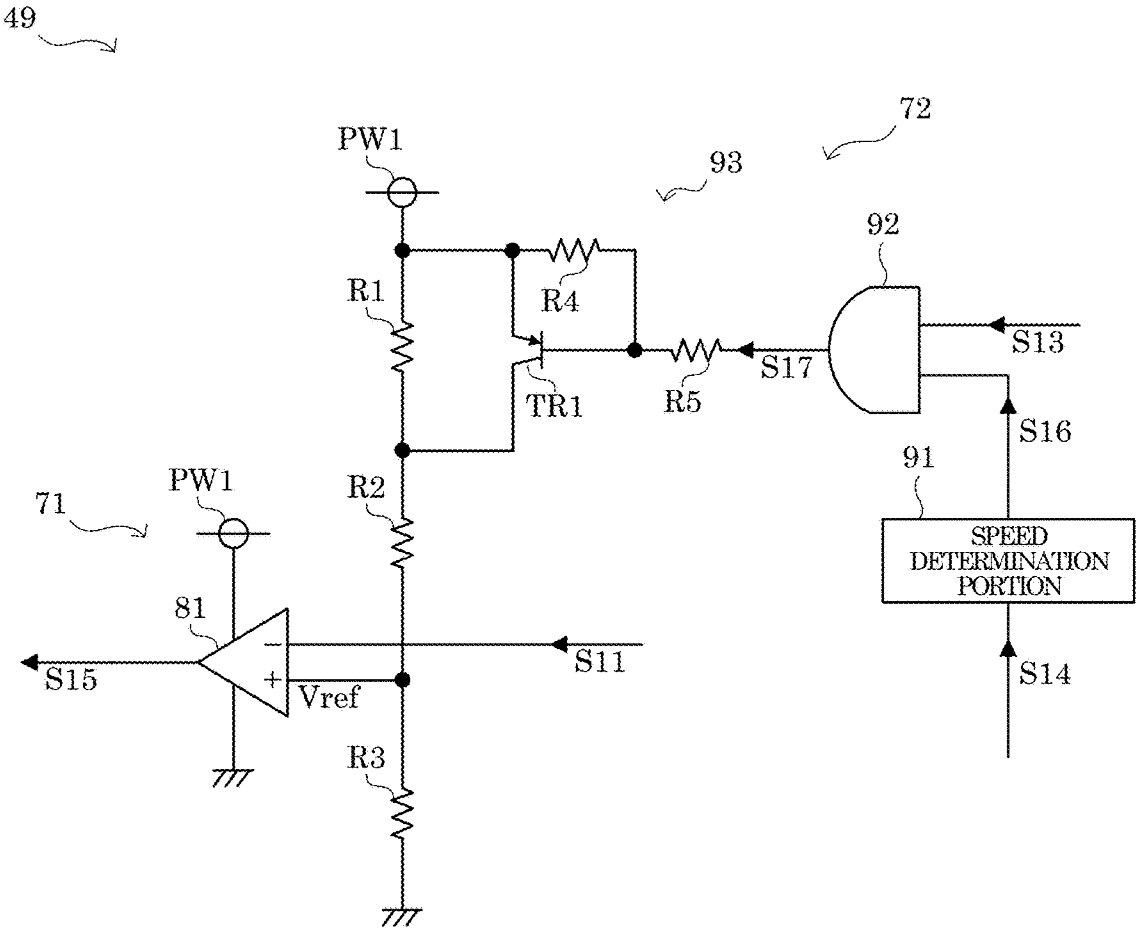
FIG. 6 is a diagram showing a configuration of a protection circuit of the image forming apparatus according to the embodiment of this disclosure.

Next, the configuration of the fixing device 27 will be described with reference to FIGS. 3 to 6. Here, FIG. 3 is a cross-sectional view of the configuration of the fixing device 27. In addition, FIG. 4 is a cross-sectional view of the configuration of a heater 42. In addition, FIG. 5 is a diagram showing the configuration of a heater drive circuit 48. In addition, FIG. 6 is a diagram showing the configuration of a protection circuit 49. It is to be noted that FIG. 5 shows an analog signal S11, a pulse signal S12, a digital signal S13, a pulse signal S14, and a digital signal S15 by arrowed one-dot chain lines.

As shown in FIG. 3, the fixing device 27 includes a fixing belt 41, the heater 42, a support portion 43, a pressing member 44, and a pressure roller 45. In addition, the fixing device 27 includes a motor 47, the heater drive circuit 48, and the protection circuit 49 shown in FIG. 5.

The fixing belt 41 is heated by the heater 42 to a predefined fixing temperature of 180 degrees Celsius or the like. The heated fixing belt 41 comes into contact with a sheet to fix a toner image transferred to the sheet onto the sheet. As shown in FIG. 3, the fixing belt 41 is endless. In addition, the fixing belt 41 has flexibility. The fixing belt 41 includes a base material layer, an elastic layer provided on the outer peripheral surface of the base material layer, and a release layer provided on the outer peripheral surface of the elastic layer. The base material layer is formed by using a metal material such as stainless steel and nickel alloy. The elastic layer is formed by using a material such as silicon rubber. The release layer is formed by using a fluorine-based resin material such as PFA (tetrafluoroethylene perfluoroalkoxy ethylene copolymer resin). The fixing belt 41 is long along the left-right direction D3. The size of the fixing belt 41 in the left-right direction D3 is determined depending on the maximum size of a sheet on which the image forming apparatus 100 is capable of forming an image. The fixing belt 41 is an example of a fixing member according to this disclosure. It is to be noted that the fixing member according to this disclosure is not limited to a belt-shaped member and may be a roller-shaped member or the like.

The pressure roller 45 is provided at a position that allows the pressure roller 45 to come into contact with an outer peripheral surface 41A (see FIG. 3) of the fixing belt 41. Specifically, as shown in FIG. 3, the pressure roller 45 is provided below the fixing belt 41. The pressure roller 45 is long along the left-right direction D3. The pressure roller 45 includes a shaft 45A and an elastic layer 45B. The shaft 45A is formed by using a metal material to have a cylindrical shape. The elastic layer 45B is formed on the outer periphery of the shaft 45A by using a material having elasticity. The shaft 45A is supported by a pair of side plates so as to be rotatable. The pair of side plates is provided inside the housing 101. The pressure roller 45 receives rotational driving force supplied from the motor 47 to rotate in a rotation direction D5 (see FIG. 3).

The heater 42 heats the fixing belt 41 upon being supplied with power. As shown in FIG. 3, the heater 42 is provided at a position opposed to the pressure roller 45 across the fixing belt 41 inside the fixing belt 41. The heater 42 is long in the left-right direction D3 and extends over both outer sides of the fixing belt 41 in the left-right direction D3.

As shown in FIG. 4, the heater 42 includes a substrate 51, a heating resistor 52, a protective layer 53, and a temperature sensor 54.

The substrate 51 is a member shaped like a flat plate that is long in the left-right direction D3. The substrate 51 is formed by using a material that is excellent in heat resistance, electrical insulation, and low-heat capacity. For example, the substrate 51 is formed by using ceramic such as alumina. The substrate 51 is larger in size in the left-right direction D3 than the fixing belt 41. The substrate 51 is disposed to extend on both outer sides of the fixing belt 41 in the left-right direction D3. Both ends of the substrate 51 in the left-right direction D3 therefore protrude from the fixing belt 41 outward in the left-right direction D3.

As shown in FIGS. 3 and 4, the lower surface of the substrate 51 is opposed to an inner peripheral surface 41B (see FIG. 3) of the fixing belt 41. As shown in FIG. 4, the heating resistor 52 is disposed on the lower surface of the substrate 51. In addition, the opposed region on the lower surface of the substrate 51 to the inner peripheral surface 41B of the fixing belt 41 is covered with the protective layer 53 (see FIG. 4). The protective layer 53 is formed by using a material such as glass having electrical insulation.

As shown in FIGS. 3 and 4, the upper surface of the substrate 51 is opposed to the bottom surface of a recessed portion 43A of the support portion 43. As shown in FIG. 4, the temperature sensor 54 is disposed on the upper surface of the substrate 51. The temperature sensor 54 senses the temperature of the fixing device 27. Specifically, the temperature sensor 54 senses the temperature of the heater 42 and outputs the analog signal S11 (see FIG. 5) of a voltage corresponding to the sensed temperature. For example, the voltage of the analog signal S11 grows lower as the temperature sensor 54 senses higher temperature. The analog signal S11 output from the temperature sensor 54 is input to the control portion 5 and the protection circuit 49.

The heating resistor 52 generates heat upon being supplied with power from a commercial power supply 200 (see FIG. 5). The heating resistor 52 is formed to have the shape of a strip that is long in the left-right direction D3 and has a predetermined thickness in the direction orthogonal to the lower surface of the substrate 51. For example, the heating resistor 52 is formed by using a material such as silver palladium (Ag/Pd). The heating resistor 52 is smaller in size in the left-right direction D3 than the fixing belt 41. The heating resistor 52 is disposed inside the opposed region on the lower surface of the substrate 51.

The support portion 43 supports the heater 42. As shown in FIG. 3, the support portion 43 is provided inside the fixing belt 41. The support portion 43 is long in the left-right direction D3 and extends over both outer sides of the fixing belt 41 in the left-right direction D3. The recessed portion 43A corresponding to the shape of the heater 42 is formed on the bottom of the support portion 43. The heater 42 is fitted into the recessed portion 43A.

The pressing member 44 presses the support portion 43 toward the pressure roller 45. As shown in FIG. 3, the pressing member 44 is provided at a position opposed to the pressure roller 45 across the support portion 43 inside the fixing belt 41. The pressing member 44 is long in the left-right direction D3 and extends over both outer sides of the fixing belt 41 in the left-right direction D3. Both ends of the pressing member 44 in the left-right direction D3 are biased toward the pressure roller 45 by an unillustrated biasing member. This causes the pressing member 44 to press the support portion 43 toward the pressure roller 45. The support portion 43 is pressed toward the pressure roller 45 to press the heater 42 supported by the support portion 43 toward the pressure roller 45.

The heater 42 is pressed toward the pressure roller 45 by the pressing member 44 to be pressure-welded to the inner peripheral surface 41B of the fixing belt 41. This forms a fixing nip portion 46 between the fixing belt 41 and the pressure roller 45. The fixing nip portion 46 fixes a toner image transferred to a sheet onto the sheet. A region in which the fixing belt 41 and the pressure roller 45 come into contact is herein defined as the fixing nip portion 46. It is to be noted that a lubricant such as fluorine grease is applied between the heater 42 and the inner peripheral surface 41B of the fixing belt 41.

The fixing belt 41 is sandwiched by the heater 42 and the pressure roller 45. When the pressure roller 45 rotates in the rotation direction D5, the fixing belt 41 rotates along a belt rotation direction D6 (see FIG. 3) following the rotation of the pressure roller 45.

The support portion 43 includes a pair of guide portions 43B that comes into contact with the inner peripheral surface 41B of the fixing belt 41 and guides the movement of the fixing belt 41. The pair of guide portions 43B is provided at both ends of the support portion 43 in the front-back direction D2. The fixing belt 41 is guided by the pair of guide portions 43B to move along a predefined movement path.

It is to be noted that the pressure roller 45 may be biased toward the heater 42. In this case, the pressing member 44 does not have to be biased by the biasing member.

The motor 47 rotates the fixing belt 41. Specifically, the motor 47 supplies rotational driving force to the pressure roller 45 to rotate the pressure roller 45, thereby rotating the fixing belt 41 following the rotation of the pressure roller 45. In a case where the signal level of the digital signal S13 (see FIG. 5) received from the control portion 5 is switched from a low level to a high level, the motor 47 transitions to a drive state from a stop state. In the drive state, the supply of power from an unillustrated power supply to the motor 47 is controlled such that the rotation speed of the motor 47 reaches a predefined specific speed. In addition, in a case where the signal level of the digital signal S13 received from the control portion 5 is switched from the high level to the low level, the motor 47 transitions to the stop state from the drive state. While rotating, the motor 47 outputs the pulse signal S14 (see FIG. 5) having a frequency corresponding to the rotation speed. The pulse signal S14 output from the motor 47 is input to the protection circuit 49.

The heater drive circuit 48 drives the heater 42. As shown in FIG. 5, the heater drive circuit 48 includes a switching element 61 and a relay 62.

As shown in FIG. 5, the switching element 61 is provided in an electrical conduction path between the commercial power supply 200 and the heater 42. The switching element 61 is a semiconductor switch capable of switching the connection and disconnection of the electrical conduction path between the commercial power supply 200 and the heater 42 upon receiving the pulse signal S12 (see FIG. 5) at a preset duty ratio that is output from the control portion 5. For example, the switching element 61 is a triac.

The control portion 5 controls the driving of the heater 42 on the basis of the temperature sensed by the temperature sensor 54. Specifically, the control portion 5 sets the duty ratio of the pulse signal S12 on the basis of the analog signal S11 received from the temperature sensor 54 such that the temperature of the fixing belt 41 reaches the fixing temperature.

As shown in FIG. 5, the relay 62 is provided in the electrical conduction path between the commercial power supply 200 and the heater 42. The relay 62 disconnects the electrical conduction path between the commercial power supply 200 and the heater 42 upon receiving the digital signal S15 (see FIG. 5) output from the protection circuit 49. For example, in a case where the signal level of the digital signal S15 output from the protection circuit 49 is the low level, the relay 62 enables the electrical conduction path between the commercial power supply 200 and the heater 42. In addition, in a case where the signal level of the digital signal S15 output from the protection circuit 49 is the high level, the relay 62 disconnects the electrical conduction path between the commercial power supply 200 and the heater 42. It is to be noted that the heater drive circuit 48 may include a switching element (different from the switching element 61) instead of the relay 62.

In the fixing device 27, the motor 47 transitions to the drive state from the stop state after the supply of power to the heater 42 is started. This heats the lubricant and decreases the sliding resistance between the heater 42 and the fixing belt 41 before the motor 47 starts to be driven. It is thus possible to reduce the load on the motor 47. In addition, in the fixing device 27, the motor 47 transitions to the stop state from the drive state after the supply of power to the heater 42 is stopped. This stops the supply of thermal energy from the heater 42 before the rotation speed of the fixing belt 41 decreases. It is thus possible to prevent the fixing belt 41 from reaching excessively high temperature at the time and after the deceleration of the rotation speed of the fixing belt 41.

The protection circuit 49 uses the relay 62 to stop the supply of power to the heater 42.

Specifically, the protection circuit 49 includes a power supply stopping portion 71 and a threshold setting portion 72 shown in FIG. 6.

The power supply stopping portion 71 stops the supply of power to the heater 42 in a case where the temperature sensed by the temperature sensor 54 exceeds the preset threshold.

As shown in FIG. 6, the power supply stopping portion 71 includes a comparator 81. The comparator 81 outputs the digital signal S15 (see FIG. 6) corresponding to a result of a comparison between the voltage of the analog signal S11 (see FIG. 6) output from the temperature sensor 54 and a reference voltage Vref (see FIG. 6) corresponding to the threshold. Specifically, in a case where the voltage of the analog signal S11 output from the temperature sensor 54 is higher than the reference voltage Vref, the comparator 81 outputs the digital signal S15 at the low level. In addition, in a case where the voltage of the analog signal S11 output from the temperature sensor 54 is lower than the reference voltage Vref, the comparator 81 outputs the digital signal S15 at the high level.

Here, a fixing device capable of changing the threshold from a first temperature to a second temperature higher than the first temperature in a case where the rotation speed of the motor 47 increases beyond a predefined reference speed, and changing the threshold from the second temperature to the first temperature in a case where the rotation speed of the motor 47 decreases beyond the reference speed has been known as the related art.

However, in the fixing device according to the related art described above, in a case where the supply of power to the heater 42 continues even after the motor 47 starts to decelerate because of the runaway or the like of the CPU 11 of the control portion 5, the fixing belt 41 may be excessively heated and the fixing belt 41 may be damaged before the rotation speed of the motor 47 decreases beyond the reference speed.

In contrast, the image forming apparatus 100 according to the embodiment of this disclosure is capable of preventing the fixing belt 41 from being damaged by excessive heating as described below.

The threshold setting portion 72 changes the threshold from the first temperature to the second temperature higher than the first temperature in an acceleration period in which the rotation speed of the motor 47 increases, and changes the threshold from the second temperature to the first temperature when a deceleration period in which the rotation speed of the motor 47 decreases starts.

For example, in a case where the rotation speed of the motor 47 increases beyond the reference speed, the threshold setting portion 72 changes the threshold from the first temperature to the second temperature. In addition, in a case where the motor 47 transitions to the stop state from the drive state, the threshold setting portion 72 changes the threshold from the second temperature to the first temperature.

For example, the first temperature is 100 degrees Celsius. In addition, the second temperature is 230 degrees Celsius.

It is to be noted that the first temperature and the second temperature may be temperatures set to any degrees Celsius.

As shown in FIG. 6, the threshold setting portion 72 includes a speed determination portion 91, an AND circuit 92, and a reference voltage switching circuit 93. The speed determination portion 91 determines whether or not the rotation speed of the motor 47 exceeds the reference speed. The reference speed is speed lower than the specific speed.

Specifically, the speed determination portion 91 is an electronic circuit that outputs a digital signal S16 (see FIG. 6) at the low level in a case where the frequency of the pulse signal S14 received from the motor 47 is lower than or equal to the frequency corresponding to the reference speed, and outputs the digital signal S16 at the high level in a case where the frequency of the pulse signal S14 received from the motor 47 exceeds the frequency corresponding to the reference speed.

The AND circuit 92 receives the digital signal S13 (see FIG. 5) output from the control portion 5 and the digital signal S16 (see FIG. 6) output from the speed determination portion 91. The AND circuit 92 outputs a digital signal S17 (see FIG. 6) at the high level only in a case where the received digital signal S13 and digital signal S16 are both at the high level.

In other words, the AND circuit 92 outputs the digital signal S17 at the high level in a case where the motor 47 is in the drive state and the rotation speed of the motor 47 exceeds the reference speed. In addition, the AND circuit 92 outputs the digital signal S17 at the low level in a case where the motor 47 is in the stop state or the rotation speed of the motor 47 is less than or equal to the reference speed.

That is, the digital signal S17 output from the AND circuit 92 is switched from the low level to the high level in an acceleration period in which the rotation speed of the motor 47 increases. In addition, the digital signal S17 output from the AND circuit 92 is switched from the high level to the low level when a deceleration period in which the rotation speed of the motor 47 decreases starts (when the state of the motor 47 is switched from the drive state to the stop state).

The reference voltage switching circuit 93 switches the reference voltage Vref between a first voltage corresponding to the first temperature and a second voltage corresponding to the second temperature in response to a change in the signal level of the digital signal S17 output from the AND circuit 92.

As shown in FIG. 6, the reference voltage switching circuit 93 includes resistors R1 to R5 and a transistor TR1.

The transistor TR1 is a PNP-type transistor.

As shown in FIG. 6, the base terminal of the transistor TR1 is connected to the output terminal of the AND circuit 92 through the resistor R5. In addition, the base terminal of the transistor TR1 is connected to the emitter terminal of the transistor TR1 through the resistor R4.

As shown in FIG. 6, the collector terminal of the transistor TR1 is connected to a power supply PW1 through the resistor R1. In addition, the collector terminal of the transistor TR1 is connected to the noninverting input terminal of the comparator 81 through the resistor R2. In addition, the collector terminal of the transistor TR1 is connected to ground through the resistor R2 and the resistor R3.

As shown in FIG. 6, the emitter terminal of the transistor TR1 is connected to the power supply PW1.

In the reference voltage switching circuit 93, the transistor TR1 is on in a case where the signal level of the digital signal S17 output from the AND circuit 92 is the low level. In a case where the transistor TR1 is on, a voltage output from the power supply PW1 is divided into the first voltage by the resistor R2 and the resistor R3 and input to the noninverting input terminal of the comparator 81.

In addition, in the reference voltage switching circuit 93, the transistor TR1 is off in a case where the signal level of the digital signal S17 output from the AND circuit 92 is the high level. In a case where the transistor TR1 is off, a voltage output from the power supply PW1 is divided into the second voltage lower than the first voltage by the resistor R1, the resistor R2, and the resistor R3 and input to the noninverting input terminal of the comparator 81.

In this way, in the image forming apparatus 100, the threshold is changed from the first temperature to the second temperature in the acceleration period in which the rotation speed of the motor 47 increases. This makes it possible to prevent the fixing belt 41 from being excessively heated when the motor 47 is stopped or while the motor 47 is rotating at low speed in comparison with the configuration in which the threshold is constantly the second temperature.

In addition, in the image forming apparatus 100, the threshold is changed from the second temperature to the first temperature when the deceleration period in which the rotation speed of the motor 47 decreases starts. This makes it possible to forcibly stop the supply of power to the heater 42 when the deceleration period starts even in a case where the CPU 11 exhibits runaway. It is thus possible to prevent the fixing belt 41 from being excessively heated before the rotation speed of the motor 47 decreases beyond the reference speed in comparison with the configuration in which the threshold is changed from the second temperature to the first temperature in a case where the rotation speed of the motor 47 decreases beyond the reference speed. This makes it possible to prevent the fixing belt 41 from being damaged by excessive heating.

Additionally, in a case where a predetermined time passes after the motor 47 transitions to the drive state from the stop state, the threshold setting portion 72 may change the threshold from the first temperature to the second temperature. For example, the threshold setting portion 72 may include a delay circuit that outputs the received digital signal S13 with a predetermined time delay instead of the speed determination portion 91.

In addition, the threshold setting portion 72 may change the threshold step by step from the first temperature to the second temperature in the acceleration period. For example, in a case where the rotation speed of the motor 47 increases beyond a first speed lower than the reference speed, the threshold setting portion 72 may change the threshold from the first temperature to a third temperature between the first temperature and the second temperature. In a case where the rotation speed of the motor 47 increases beyond a second speed higher than the reference speed and lower than the specific speed, the threshold setting portion 72 may change the threshold from the third temperature to the second temperature.

In addition, the heater 42 may include the plurality of temperature sensors 54 disposed to be spaced apart from each other in the left-right direction D3. In this case, it is sufficient if the protection circuit 49 includes the power supply stopping portions 71 corresponding to the respective temperature sensors 54.

In addition, the temperature sensor 54 may sense the temperature of a component member different from the heater 42 in the fixing device 27. For example, the temperature sensor 54 may sense the temperature of the fixing belt 41.

Supplementary Notes of Invention

The gist of the invention extracted from the embodiment described above will be supplementarily noted below. It is to be noted that the respective configurations and the respective processing functions described in the following supplementary notes can be sorted out and used in any combination.

Supplementary Note 1

A fixing device including:

a fixing member configured to fix a toner image transferred to a sheet onto the sheet;

a motor configured to rotate the fixing member;

a heater configured to heat the fixing member upon being supplied with power;

a temperature sensor configured to sense temperature of the fixing device;

a power supply stopping portion configured to stop supply of power to the heater in a case where the temperature sensed by the temperature sensor exceeds a preset threshold; and a threshold setting portion configured to change the threshold from a predefined first temperature to a second temperature higher than the first temperature in an acceleration period in which rotation speed of the motor increases, and change the threshold from the second temperature to the first temperature when a deceleration period in which the rotation speed of the motor decreases starts.

Supplementary Note 2

An image forming apparatus including an image forming portion including the fixing device according to Supplementary Note 1, the image forming portion being configured to form an image on the sheet.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A fixing device comprising:

a fixing member configured to fix a toner image transferred to a sheet onto the sheet;

a motor configured to rotate the fixing member;

a heater configured to heat the fixing member upon being supplied with power;

a temperature sensor configured to sense temperature of the fixing device;

a power supply stopping portion configured to stop supply of power to the heater in a case where the temperature sensed by the temperature sensor exceeds a preset threshold; and a threshold setting portion configured to change the threshold from a predefined first temperature to a second temperature higher than the first temperature in an acceleration period in which rotation speed of the motor increases, and change the threshold from the second temperature to the first temperature when a deceleration period in which the rotation speed of the motor decreases starts.

2. An image forming apparatus comprising an image forming portion including the fixing device according to claim 1, the image forming portion being configured to form an image on the sheet.

* * * * *